(12) United States Patent
Parikh et al.

(10) Patent No.: US 7,802,176 B2
(45) Date of Patent: Sep. 21, 2010

(54) USING STATE MACHINES IN NAVIGATION

(75) Inventors: Sujal S. Parikh, Redmond, WA (US);
Kusuma P. Vellanki, Portland, OR (US);
Lauren B. Lavoie, Seattle, WA (US);
David P. Relyea, Bellevue, WA (US);
Martha M. Rotter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1369 days.

(21) Appl. No.: 11/174,264

(22) Filed: Jul. 1, 2005

(65) Prior Publication Data
US 2007/0005220 A1    Jan. 4, 2007

(51) Int. Cl.
*G06F 17/00* (2006.01)
(52) U.S. Cl. ............... 715/203; 715/201; 715/209; 715/234; 715/240
(58) Field of Classification Search ............. 701/1, 701/100; 715/201, 203, 209, 234, 240
See application file for complete search history.

(56) References Cited

U.S. PATENT DOCUMENTS

| 6,177,936 | B1 * | 1/2001 | Cragun ................. 715/760 |
| 6,763,496 | B1 * | 7/2004 | Hennings et al. ......... 715/205 |
| 7,054,870 | B2 * | 5/2006 | Holbrook ............... 707/10 |
| 2002/0138624 | A1 * | 9/2002 | Esenther .............. 709/227 |
| 2004/0148279 | A1 * | 7/2004 | Peleg ................. 707/3 |
| 2005/0204034 | A1 * | 9/2005 | Betarbet .............. 709/224 |

OTHER PUBLICATIONS

"Using Netscape", by Warren Ernst, published Mar. 1995, pp. c, i, ii, 26, 27, 36, 49, 274.*
"The Complete Idiot's Guide to the Internet", by Peter Kent, published 1999, pp. c, i, ii,70, 74, 80, 206.*

* cited by examiner

*Primary Examiner*—William L Bashore
*Assistant Examiner*—Gregory A Distefano
(74) *Attorney, Agent, or Firm*—Workman Nydegger (57) ABSTRACT

Navigating through pages of content. In aspects, a state machine is provided that simplifies navigating. The state machine allows multiple navigation services to work together in a hierarchical manner to obtain content. The state machine also provides a mechanism for stopping navigation and responding to errors.

14 Claims, 5 Drawing Sheets

USING STATE MACHINES IN NAVIGATION

BACKGROUND

Many programs now allow a user to navigate from one page to another. A page may include content such as text that is quickly downloadable and also may include other content such as images that takes longer to download. Furthermore, a user may request that a program stop navigating to a requested page and/or errors may occur while navigating. As pages have become more complex, the difficulty of efficiently and robustly navigating through pages of content has also become more complex.

SUMMARY

Briefly, aspects of the subject matter described herein relate to navigating through pages of content. In aspects, a state machine is provided that simplifies navigating. The state machine allows multiple navigation services to work together in a hierarchical manner to obtain content. The state machine also provides a mechanism for stopping navigation and responding to errors.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

Other aspects will become apparent from the following Detailed Description when taken in conjunction with the drawings, in which:

DETAILED DESCRIPTION

Exemplary Operating Environment

Figure 1:
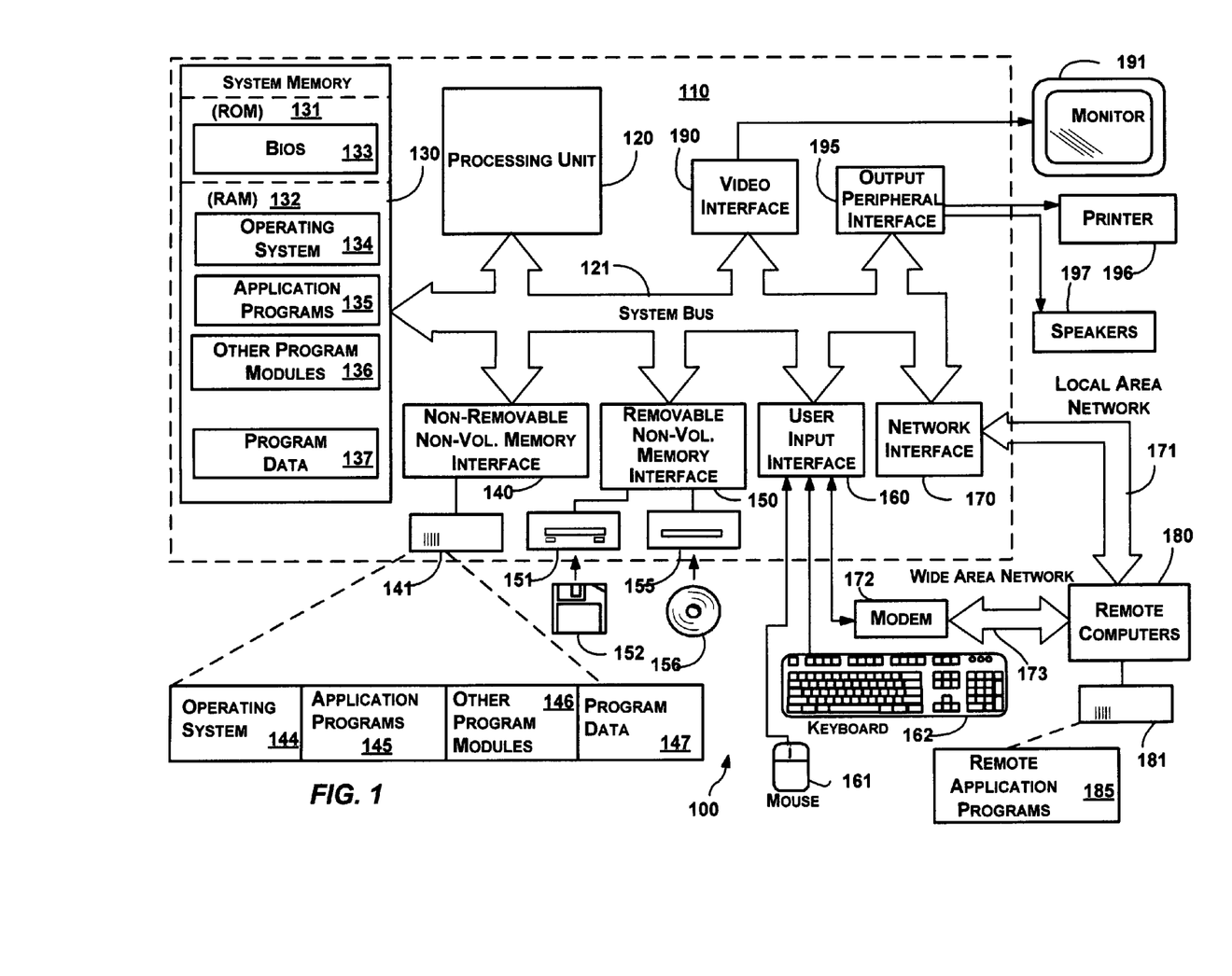
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Navigation

An application may include multiple pages which may be displayed. Each page may include or be associated with content such as text, images, and the like. These pages may be linked together with hyperlinks or the like such that when a hyperlink is selected navigation occurs to the page referenced by the hyperlink. Furthermore, a development framework may be provided which allows a developer or the like to create pages and link them together via hyperlinks. The developer may be able to define the pages using a markup language or the like. Using the markup language as input, the framework may be able to locate content associated with the pages, format the content into pages, display the pages, and allow navigation to occur between pages.

Figure 2:
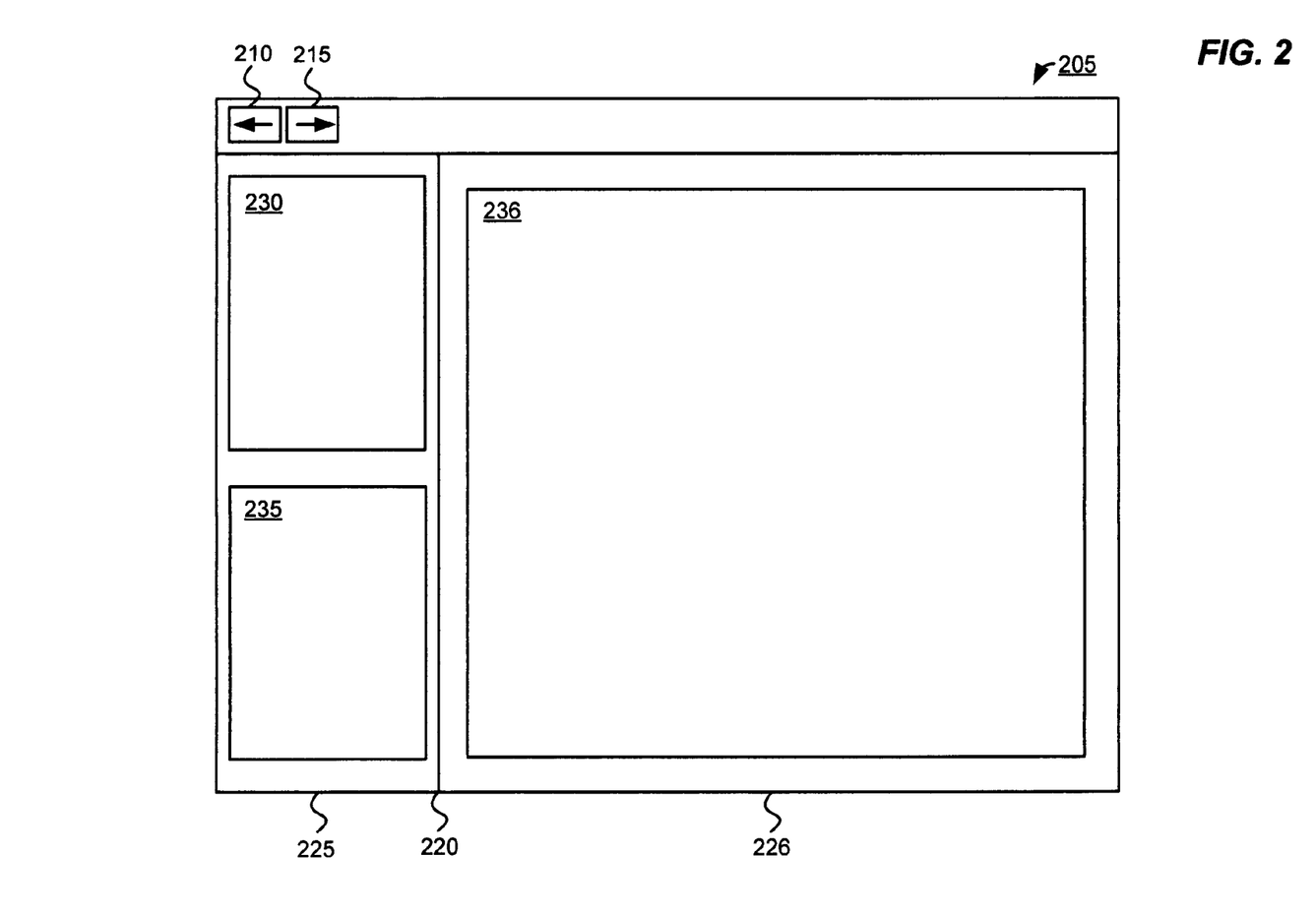
FIG. 2 is a block diagram that represents exemplary elements that may be used by a program in navigating between various pages in accordance with aspects of the subject matter described herein.

FIG. 2 is a block diagram that represents exemplary elements that may be used by a program in navigating between various pages in accordance with aspects of the subject matter described herein. The program may display the elements in a window 205. The elements may include a backward navigation button 210, a forward navigation button 215, and a grid 220 including columns 225-226. The column 225 may include a text box 230 and a frame 235. The column 226 may include a frame 236.

The navigation buttons 210 and 215 may allow a user to navigate to previously viewed content. For example, if in the frame 236, a user hyperlinked from a first page to a second page, the user may use the backward navigation button 210 to return to the first page. Afterwards, the user may use the forward navigation button 215 to return to the second page.

The window 205 and each of the frames 235-236 may display pages independently of each other. For example, frame 235 may display a page associated with stock prices while frame 236 may display a page associated with a sport.

In addition, a user may navigate in one frame or window without affecting the content in the other frame.

In another embodiment, the window 205 and/or frames 235-236 may be dependent on each other. For example, the frame 235 may display a table of contents having hyperlinks while the frame 236 may display pages referenced by the hyperlinks. Selecting a hyperlink in the frame 235 may cause the frame 236 to navigate to a page referenced by the hyperlink.

The grid 220, the columns 225 and 226, and the text box 230 may be non-navigable elements. That is, they may not include or reference code that allows them to navigate to other pages.

Figure 3:
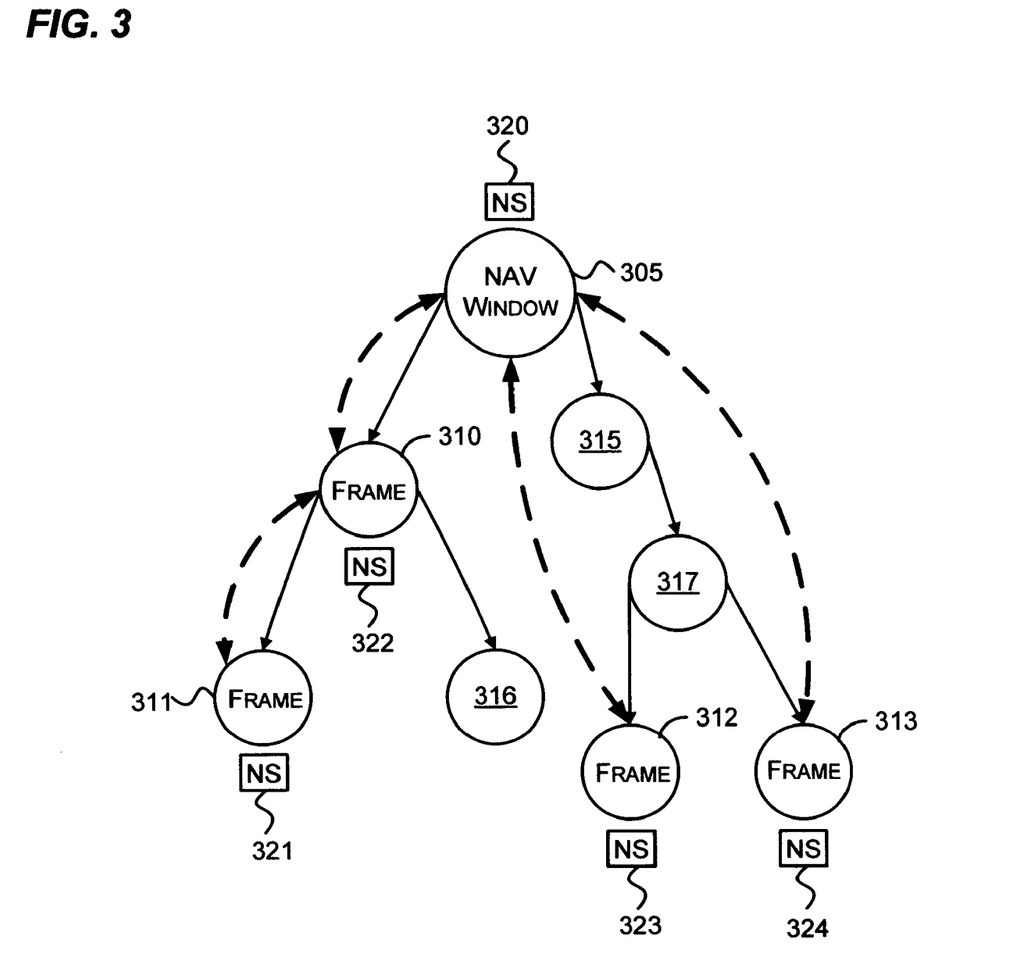
FIG. 3 is a block diagram that generally represents an exemplary hierarchy of elements and navigation services in accordance with aspects of the subject matter described herein.

FIG. 3 is a block diagram that generally represents an exemplary hierarchy of elements and navigation services in accordance with aspects of the subject matter described herein. The hierarchy includes a navigation window 305, frames 310-313, and other elements 315-317. Each of the navigable elements (e.g., the navigation window 305 and the frames 311-313) may be associated with navigation services 320-324, respectively.

The navigation window 305 may comprise an object that has navigation capabilities and is capable of displaying a window. With the appropriate elements, an exemplary window that may be displayed by a navigation window is that represented in FIG. 2. The navigation window 305 may include one or more application programming interfaces (APIs) which may be called to initiate or stop a navigation. The navigation window 305 may also comprise a bookkeeping mechanism (sometimes referred to as a journal) that indicates a history of pages that have been displayed. The navigation window 305 may display back and forward navigation buttons (e.g., such as navigation buttons 210 and 215 of FIG. 2) to allow navigation to previously viewed pages.

The frames 310-313 correspond to navigable regions displayed in a window. A frame (e.g., frame 311) may be nested within another frame (e.g., frame 31Q) or within a navigation window (e.g., navigation window 305). A user may navigate in a frame with or without affecting other areas displayed by the navigation window 305 as described previously. In one embodiment, a frame may act similar to an HTML IFrame.

The navigation window 305 and the frames 310-313 may be referred to as navigation containers. In this sense, they may be thought of as containers in which a navigation may occur. In each container, a user may navigate from one page (or a portion thereof) to another page (or a portion thereof).

Typically, frames are hosted by (e.g., associated with) a particular navigation window. For example, in one embodiment, the frames 310-313 are hosted by the navigation window 305.

Each of the navigation services 320-324 may provide an implementation that downloads pages that are being navigated to and that gives such pages to its associated navigable element. Each navigation service may be implemented as a class that exposes interfaces that allows navigation to begin or stop or to refresh navigated content. Each navigation service may also provide events that indicate when navigation is occurring, when navigation has completed, if an error has occurred, when content is ready to be displayed, and when loading of content is completed. Each navigation service may implement a state machine as described in more detail in conjunction with FIG. 4.

A navigation tree may be created from the navigable elements as represented by the dashed lines. The navigation service associated with each navigable element may have pointers to the navigation services associated with each of the element's navigable children elements and vice versa. This may be used to allow the navigation services to communicate with each other (e.g., to indicate state changes, stop navigation, and so forth) in a hierarchical manner.

Elements 315-317 may comprise non-navigable elements. For example, the elements 315-317 may comprise a column, grid, text box, drop down list box, combo box, or any other element that does not navigate to another page.

While navigation has been described with respect to navigation windows and frames, it will be recognized that other elements may be used without departing from the spirit or scope of the subject matter described herein. For example, aspects described herein may also be applied to images.

Figure 4:
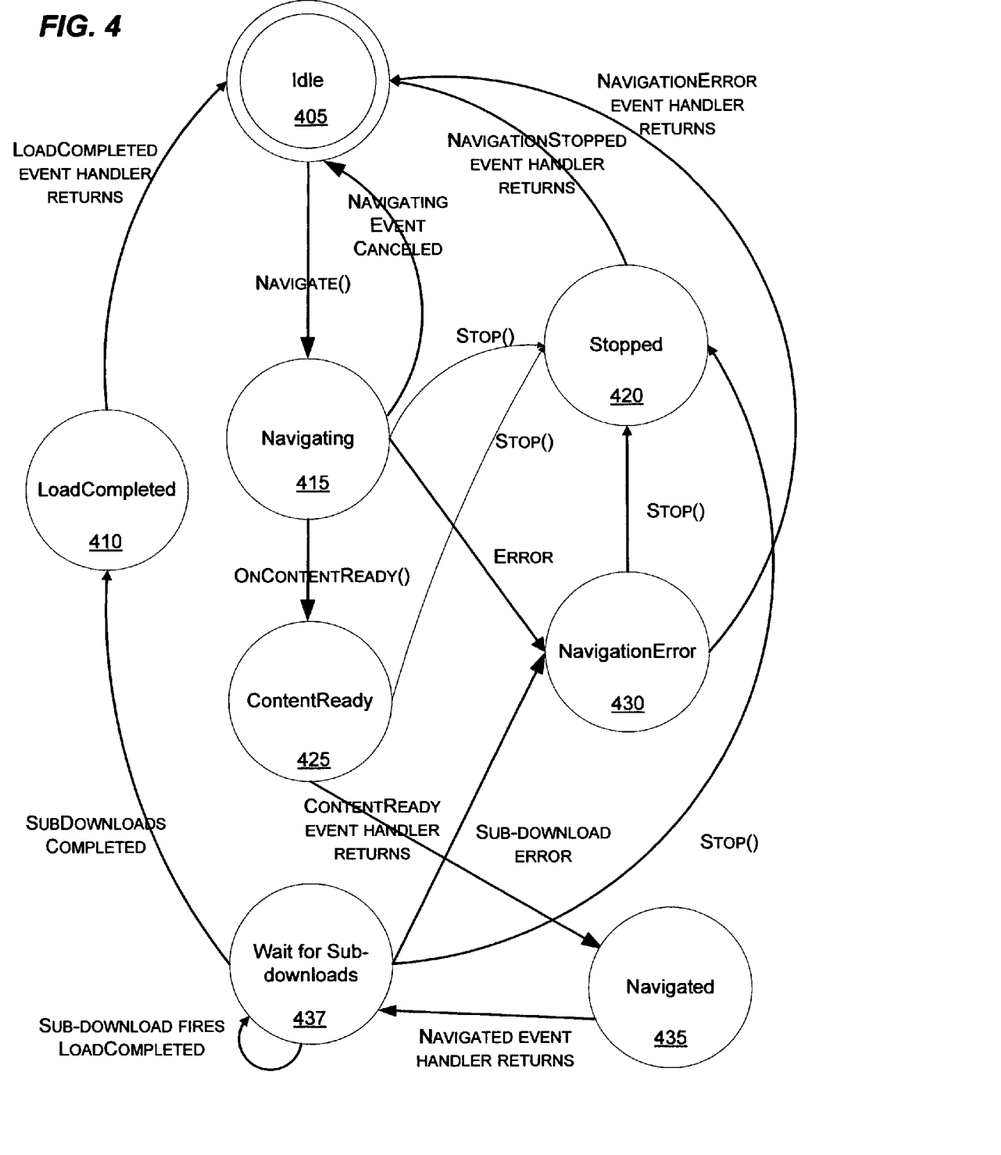
FIG. 4 is a state diagram generally representing states and transitions that may occur in accordance with aspects of the subject matter described herein.

FIG. 4 is a state diagram generally representing states and transitions that may occur in accordance with aspects of the subject matter described herein. The states may include an idle state 405, a load completed state 410, a navigating state 415, a stopped state 420, a content ready state 425, a navigation error state 430, a navigated state 435, and a wait for sub-downloads state 437. It will be recognized, however, that the states may include more, fewer, or different states without departing from the spirit or scope of the subject matter described herein.

One or more of the states may correspond to an event that is fired by each navigation service as it enters a state. Transitions between states may occur in response to an API called by a program (e.g., Navigate( )) or in response to something that happens as the navigation service attempts to navigate. For example, a transition to the navigation error state 430 may occur if an error occurs (e.g., content is not found) while in the navigating state 415 or an error occurs in the wait for sub-downloads state 437 (e.g., if one of a navigable element's navigable descendants in its navigation tree is unable to access content).

When a navigation service is instantiated by a navigable element, the navigation service starts in the idle state 405. When a request to navigate to a page is received by a navigation service, the navigation service transitions to the navigating state 415. In requesting to navigate to a page, a program may pass a uniform resource identifier (URI) or the like to which to navigate.

Upon entering the navigating state 415, the navigation service may fire a navigating event. This may be used to notify that the navigating state has been entered into by a particular navigation service. During the navigating state 415, content from the URI or the like is obtained and used to create an object. When the object is provided with at least some of the content, a callback (e.g., OnContentReady( )) occurs. Upon receiving the callback, the navigating service transitions to the content ready state 425.

It will be recognized that obtaining content from a URI or the like may occur in stages. In some embodiments, when enough content is obtained to aesthetically display something to a user, the callback (e.g., OnContentReady( )) may occur. In entering the content ready state, more content may need to be downloaded before the content is fully loaded. For example, when navigating to content that comprises multiple pages, after the first page is loaded, the callback may be called. In other embodiments, the timing of calling the callback may vary. In some embodiments, all content may be downloaded before calling the callback. In other embodiments, less than all the content may be downloaded before calling the callback.

Upon entering the content ready state 425, the navigation service may fire a content ready event. After a content ready event handler returns, the navigation service may transition into the navigated state 435.

Upon entering the navigated state 435, the navigation service may fire a navigated event. After the navigated event handler returns, the navigation service may transition into the wait for sub-downloads state 437. Each time a navigation service associated with a navigable descendent element fires a load completed event, the parent navigation service may self-transition into the wait for sub-downloads state 437. When all of the navigation services of the navigable descendent elements have fired their load completed events, the parent navigation service transitions into the load completed state 410.

Upon entering the load completed state 410, the navigation service may fire a load completed event. A navigation is fully complete when a navigation window and all of its navigable descendant elements (e.g., frames 310-313 of FIG. 3) have completed downloading content. Similarly, a frame (e.g., frame 310) has completed its navigation when it and all of its navigable descendent elements (e.g., frame 311) have completed downloading content (e.g. load completed state 410). Each navigation service provides notification that it has entered the load completed state 410 by firing a load completed event.

After a load completed event handler returns, the navigation service transitions to the idle state 405.

Via an API, a program may request that navigation stop. For example, a user may select a stop button on a browser or other program which may cause the browser or other program to send a stop request to the navigation service associated with the actively navigating (e.g., window or frame) element. When in any of the navigating state 415, the content ready state 425, the wait for sub-downloads state 437, and the navigation error state 430, the navigation service may then transition to the stopped state 420 and inform all navigation services associated with navigable descendent elements to stop navigating.

Upon entering the load stopped state 420, the navigation service may fire a stopped event. After a navigation stopped event handler has returned, the navigation service may then transition to the idle state 405.

During navigation, an error may occur. For example, when the navigation service fails to bind to a URI (e.g., the URI does not exist, an ISP fails, or a network problem occurs), an error may occur. When an error occurs while in the navigating state 415 or the wait for sub-downloads state 437, the navigation service transitions to the navigation error state 430. If an error occurs in the navigating state 415, this is an error associated with navigation service. If an error occurs while in the navigated state, this is an error associated with one of the navigation services associated with navigable descendent elements.

From the navigation error state 430, the navigation service may transition to the stopped state 420 (e.g., if a stop request is received) or may transition to the idle state 405 after a navigation error handler returns.

Figure 5:
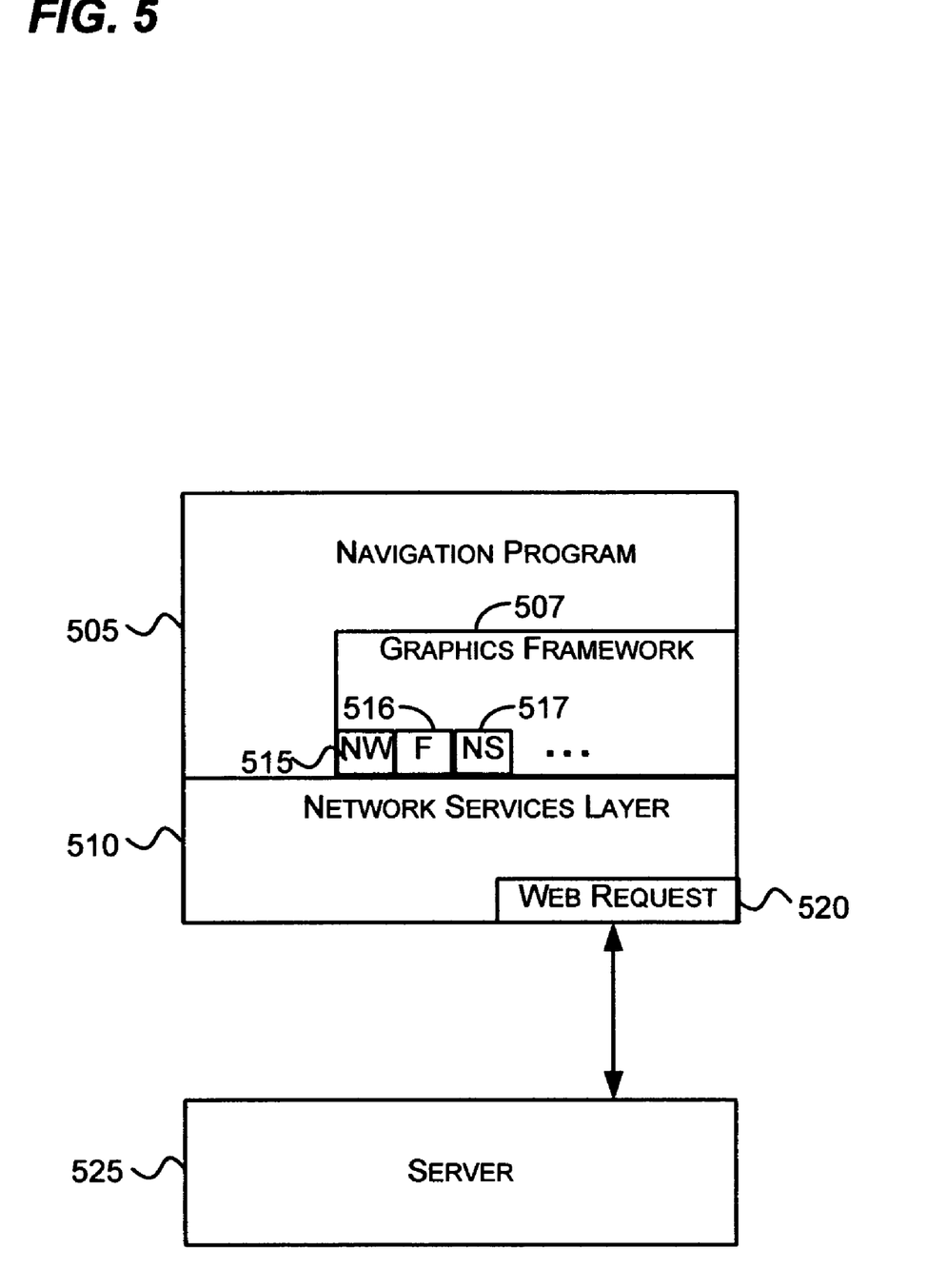
FIG. 5 is a block diagram that generally represents an environment in which aspects of the subject matter described herein may operate.

FIG. 5 is a block diagram that generally represents an environment in which aspects of the subject matter described herein may operate. The environment may include a navigation program 505, a graphics framework 507, a network services layer 510, and a server 525. The graphics framework may include APIs including a navigation window API 515, a frame API 516, a navigation service API 517, and other APIs for presenting and manipulating graphics.

The navigation program may communicate (e.g., via APIs) with the graphics framework 507 and the network services layer 510. The graphics framework may communicate with the navigation program 505 and the network services layer 510.

The network services layer 510 may include a web request component 520 that is capable of communicating with the server 525.

In operation, the navigation program may call an API of the navigation window 515 or the frame 516 and pass a URI that is associated with content that defines a user interface. The navigation window 515 or the frame 516 may forward the URI to the navigation service 517. The navigation service 517 may then use the network services layer 510 web request component 520 to obtain the content associated with the URI. This content may reside on a local or remote server as represented by server 525.

After receiving all or some of the content, the network service 517 may pass the content to its associated network window 515 or frame 516 which then may render the content. The navigation program 505 may request that the navigation window 515 or frame 516 stop navigating. In response, the navigation window 515 or frame 516 forwards the request to the navigation service 517 which may then take actions as described previously.

As can be seen from the foregoing detailed description, aspects have been described for using state machines to navigate through pages of content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable medium having computer-executable instructions that when executed by a processor cause a computing system to perform a method of navigating one or more web pages, the method comprising:

receiving a request to navigate to a web page, the web page including a plurality of navigable elements that includes at least a first and a second navigable element, wherein the second navigable element is a descendent of the first navigable element and wherein the first navigable element is associated with a first navigation service and wherein the second navigable element is associated with a second navigation service, the first and second navigation services being configured to navigate independently of each other, wherein the first navigation service is associated with a first state machine and the second navigation services is associated with a second state machine, wherein both state machines are configured to allow the plurality of navigation services to work together in an hierarchical manner;

in response to the request, commencing to download content of the web page to the first and second navigable elements and transitioning the first and second state machines from an idle state to a navigating state to indicate that content is being downloaded to the first and second navigable elements;

after receiving the content to be displayed in the first navigable element and while content is still being downloaded to the second navigable element, transitioning the first state machine to a wait state and waiting in the wait state until the content to be displayed in the second navigable element has been downloaded to the second navigable element;

after receiving and displaying the content in the second navigable element, transitioning the second state machine to an idle state, wherein upon transitioning to the idle state, the second navigation service sends the first navigation service a load completed event to notify the first navigation service that the content has been loaded in the second navigable element; and upon receiving the load completed event, transitioning the first state machine to the idle state indicating that all content to be displayed within the plurality of navigable elements has been loaded.

2. The computer-readable medium of claim 1, wherein first and second state machines also include an error state to which they transition if an error occurs during the downloading or loading of the corresponding content.

3. The computer-readable medium of claim 2, wherein the first and second state machines also include a stopped state to which they transition when a stop command is received at the corresponding navigation service.

4. The computer-readable medium of claim 3, wherein the stop command is received at the first navigation service, and wherein the method further comprises notifying the second navigation service to stop downloading content and transition to the stopped state.

5. The computer-readable medium of claim 4, wherein after receiving the notification of the stop command, the second navigation service notifies any child navigation services to which it is a parent such that each child navigation service transitions its corresponding state machine to the stopped state.

6. The computer-readable medium of claim 2, wherein the error state is reached from the navigating state or while waiting for sub-downloads to complete when an error occurs in navigating.

7. The computer-readable medium of claim 1, wherein the first navigable element is the main window of the web page, and the second navigable element is a frame of the web page.

8. In a computing environment, an apparatus, comprising:
one or more processors;
system memory;
a component arranged to request navigation to a web page, the web page including a plurality of navigable elements that includes at least a first and a second navigable element, wherein the second navigable element is a descendent of the first navigable element and wherein the first navigable element is associated with a first navigation service and wherein the second navigable element is associated with a second navigation service, the first and second navigation services being configured to navigate independently of each other, wherein the first navigation service is associated with a first state machine and the second navigation service is associated with a second state machine, wherein both state machines are configured to allow the plurality of navigation services to work together in an hierarchical manner;

wherein the second navigation service loads content into the second navigable element, wherein the second state machine transitions the second navigation service to an idle state upon completion of the content being loaded; and wherein the first state machine transitions the first navigation service into a wait for sub-downloads state after the content to be displayed in the first navigable element has been loaded and before the content to be displayed in the second navigable element has been loaded, wherein the first navigation service remains in the wait for sub-downloads state until being notified by the second navigation service that the second state machine has entered an idle state indicating that the content to be displayed in the second navigable element has been loaded, and upon receiving the notification, the first state machine transitions into the idle state indicating that all content to be displayed within the plurality of navigable elements has been loaded.

9. The apparatus of claim 8, further comprising a graphics framework arranged to provide application programming interfaces to display and manipulate images and text and a network services layer arranged to locate and obtain content associated with a resource identifier.

10. The apparatus of claim 8, wherein the state machines include a navigating state that indicates that content is being downloaded.

11. The apparatus of claim 10, wherein the first navigation service is further arranged to instruct the second navigation service to navigate to a page for the second navigable element.

12. The apparatus of claim 11, wherein the first and second state machines also include a stopped state to which they transition when a stop command is received at the corresponding navigation service, and an error state to which they transition if an error occurs during the downloading or loading of the corresponding content.

13. The apparatus of claim 11, wherein the first navigation service is further arranged to instruct the second navigation service to stop navigating in response to a request to stop navigating.

14. The apparatus of claim 8, further comprising a network services layer arranged to communicate with a server in a response to a request to obtain content associated with the web page.

* * * * *